(12) United States Patent
Chavan

(10) Patent No.: US 12,470,127 B1
(45) Date of Patent: Nov. 11, 2025

(54) POWER SUPPLY MODULE RESPONSIVE TO HIGH AND LOW LINE CURRENTS

(71) Applicant: Smart Wires Inc., Union City, CA (US)

(72) Inventor: Govind Chavan, Union City, CA (US)

(73) Assignee: Smart Wires Inc., Durham, NC (US)

( * ) Notice: Subject to any disclaimer, the term of this patent is extended or adjusted under 35 U.S.C. 154(b) by 976 days.

(21) Appl. No.: 17/574,296

(22) Filed: Jan. 12, 2022

Related U.S. Application Data

(60) Provisional application No. 63/263,792, filed on Nov. 9, 2021.

(51) Int. Cl.
*H02M 1/32* (2007.01)
*H02M 3/158* (2006.01)

(52) U.S. Cl.
CPC ............. *H02M 1/32* (2013.01); *H02M 3/158* (2013.01)

(58) Field of Classification Search
CPC ................................ H02M 1/32; H02M 3/158
See application file for complete search history.

(56) References Cited

U.S. PATENT DOCUMENTS

| | | |
|---|---|---|
| 9,543,072 B2 | 1/2017 | Vos |
| 9,753,469 B2 | 9/2017 | McCollough |
| 9,876,388 B2 | 1/2018 | Steiner-Jovic et al. |
| 10,031,166 B2 | 7/2018 | Kadonoff |
| 10,097,037 B2 * | 10/2018 | Inam ................. H02J 13/00022 |
| 2015/0108966 A1 | 4/2015 | Kadonoff |
| 2015/0137596 A1 | 5/2015 | Steiner-Jovic et al. |
| 2016/0276954 A1 | 9/2016 | Vos |
| 2017/0199533 A1 | 7/2017 | McCollough |
| 2020/0067309 A1* | 2/2020 | Ginart ............... H02J 13/00016 |
| 2020/0075235 A1 | 3/2020 | Montenegro et al. |
| 2021/0088561 A1 | 3/2021 | Mobley et al. |
| 2021/0102981 A1 | 4/2021 | Mobley |
| 2021/0109131 A1 | 4/2021 | Chung |

* cited by examiner

*Primary Examiner* — Rafael O De Leon Domenech
(74) *Attorney, Agent, or Firm* — Womble Bond Dickinson (US) LLP

(57) ABSTRACT

A power supply module harvests power at low and high line currents of a power transmission line. The power supply module uses a current transformer, which may power controllers. The current transformer has a single turn primary winding, which can be coupled to a power transmission line, and a single secondary winding connected to the power supply module.

4 Claims, 5 Drawing Sheets

60

61
Couple to the power transmission line a primary winding of a current transformer having a single turn primary winding and a single secondary winding

62
Configure the current transformer to operate in a linear state for line currents in a range corresponding to normal operations, and to operate in a saturated state for line currents exceeding the range corresponding to normal operations

63
Provide a regulated DC power supply for powering controllers, and if the line current goes to zero, for enabling the safe shutdown of the controllers

FIG. 5

POWER SUPPLY MODULE RESPONSIVE TO HIGH AND LOW LINE CURRENTS

CROSS REFERENCE TO RELATED APPLICATIONS

This application claims the benefit of U.S. Provisional Application No. 63/263,792 titled Power Supply Module Responsive to High and Low Line Currents and filed on Nov. 9, 2021, the disclosure of which is incorporated herein by reference.

TECHNICAL FIELD

This application relates to a power supply module that supports impedance injection of a power flow control system for high and low line currents flowing in a power transmission line.

BACKGROUND

A power flow control system is equipped to control current flow in a power transmission line by injecting impedance into the power transmission line. For versatility in the field, where the power transmission line current may vary from tens of amperes to thousands of amperes, it is desirable to support impedance injection at both high and low line currents.

BRIEF DESCRIPTION OF THE DRAWINGS

FIG. 5 is a flow diagram illustrating a method for harvesting power from a variable line current of a power transmission line according to an embodiment.

DETAILED DESCRIPTION

Figure 1:
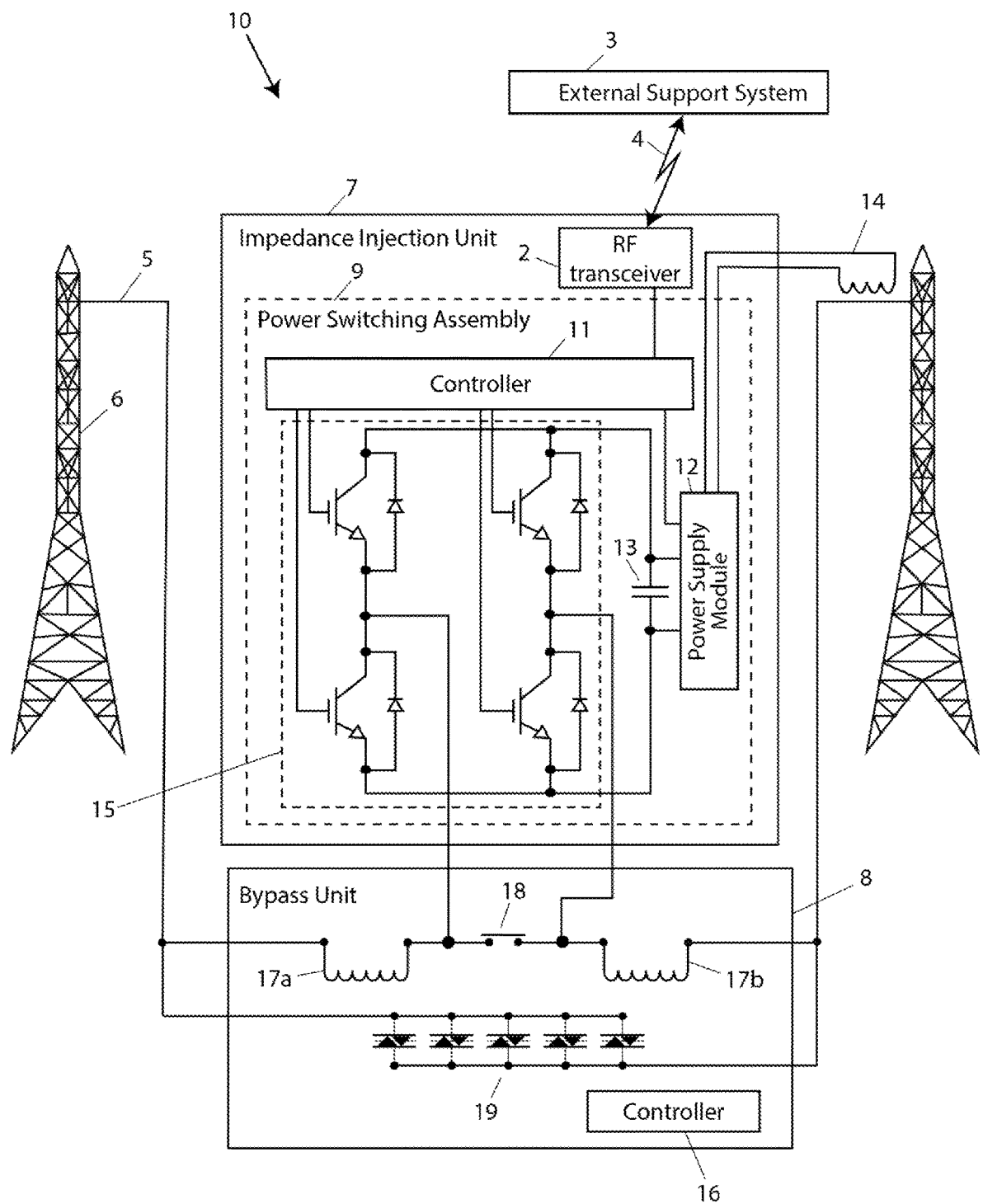
FIG. 1 illustrates an impedance injection unit connected in series with a power transmission line, the impedance injection unit including a power supply module according to an embodiment.

In a series connected power flow control module, it is useful to harvest sufficient power from a power transmission line for entering an injection mode when the line current is low. This is possible using a power supply module having a current transformer with a single turn primary winding and a single secondary winding and a high permeability core. The B/H characteristic of the transformer includes a linear region where the current transformer functions normally, and a saturated region where the transformer secondary winding current is close to zero. This combination enables injection at low currents such as 10-50 A while the power flow control module remains undamaged from high fault currents such as a peak transient current of 180 kA in the power transmission line.

In various embodiments described herein, a power flow control system in the form of an impedance injection unit connected in parallel with a bypass unit is series connected to a power transmission line and includes a full bridge inverter for charging and discharging a DC link capacitor. The impedance injection unit includes a power supply module operable to harvest power from line current in the power transmission line, at both low and high line currents. The power supply module includes a current transformer having a single turn primary winding and a single secondary winding that is wound on a core material having high permeability. A control switch is coupled to the secondary winding, a rectifier is coupled to the control switch, and a DC power supply capacitor is coupled to the rectifier, producing an output of the DC power supply module suitable for powering controllers in the impedance injection unit and in the bypass unit. The control switch is controlled by a feedback loop that couples the output of the DC power supply module to the control switch. The feedback loop includes a comparator with a reference DC input and a hysteresis function. The core material having high permeability may comprise an iron-based amorphous alloy. The control switch may include a pair of insulated gate bipolar transistors (IGBTs) or it may include a single metal oxide semiconductor field effect transistor (MOSFET). The rectifier may be a full-wave bridge rectifier. An energy storage circuit may be included in the DC power supply module to provide safety operations such as safely powering down the impedance injection unit and the bypass unit following a fault in the transmission line.

By responding to high current surges by operating in a saturated state of a transformer, power supply module 12 may be operable to withstand fault currents in the power transmission line, including a peak fault current up to 180 kA (kiloamperes) for example, and an RMS current up to 63 kA, for example, having a duration of one second. Furthermore, the power flow control system may be adaptive to non-linear changes in line current that may occur due to load changes or due to grid network switching for example. The power flow control system may be configurable to enter injection mode when the line current is in a range as low as 10-50 A, as an example, to be further described in reference to FIG. 3. In an embodiment, when entering the injection mode, the impedance injection unit may inject impedance into the power transmission line when the line current is in the range of 10-50 A, for example. By making use of the energy storage circuit, it may also be configurable to wirelessly communicate commencement of a shutdown procedure to an external support system in the event of a power failure, using an RF transceiver as depicted in FIG. 1.

In one aspect, a method for harvesting power from a variable line current of a power transmission line is described. The method may include coupling to the power transmission line a primary winding of a current transformer having a single turn primary winding and a single secondary winding; configuring the current transformer to operate in a linear state for line currents in a range corresponding to normal operations, and to operate in a saturated state for line currents exceeding the range corresponding to normal operations; and providing a regulated DC power supply for powering controllers, and if the line current goes to zero, enabling the safe shutdown of the controllers. The method may include adapting to nonlinear transients in line current while maintaining a predetermined direct current (DC) voltage at the DC power supply capacitor.

FIG. 1 illustrates a power flow control system 10 series connected to a power transmission line 5, according to an embodiment. Power transmission line 5 may be carried on towers 6 for example. Power flow control system 10 may include an impedance injection unit 7 and a bypass unit 8. Bypass unit 8 may be used to bypass a fault current flowing in transmission line 5, to protect impedance injection unit 7. Impedance injection unit 7 may include a power switching assembly 9, a power supply module 12, a DC link capacitor 13, and a current transformer 14 coupled from power supply module 12 to transmission line 5. The DC link capacitor 13 may be charged and discharged using a full bridge inverter 15. Power switching assembly 9 may include a controller 11. Power flow control system 10 may be configured as shown to communicate from controller 11 to and from an external support system 3 via a radio frequency (RF) transceiver 2 and external RF link 4. In an embodiment, controller 11 may communicate a commencement of a shutdown procedure to external support system 3 via RF transceiver 2 and external RF link 4 in the event of a power failure. Depending on the severity of the failure, external support system 3 may invoke circuit breakers acting on the power transmission line to isolate a fault. It will be shown that power supply module 12 is operable to support injection by impedance injection unit 7 during both high and low line currents. Bypass unit 8 may include a controller 16, differential chokes 17a, 17b, a vacuum interrupter (VI) 18, and a bank (i.e., multiple) of silicon-controlled rectifiers (SCRs) 19. The impedance injection unit 7 and the bypass unit 8 may independently handle surge currents safely, or they may cooperate in achieving this goal through coordination between controller 11 of impedance injection unit 7 and controller 16 of bypass unit 8.

Figure 2:
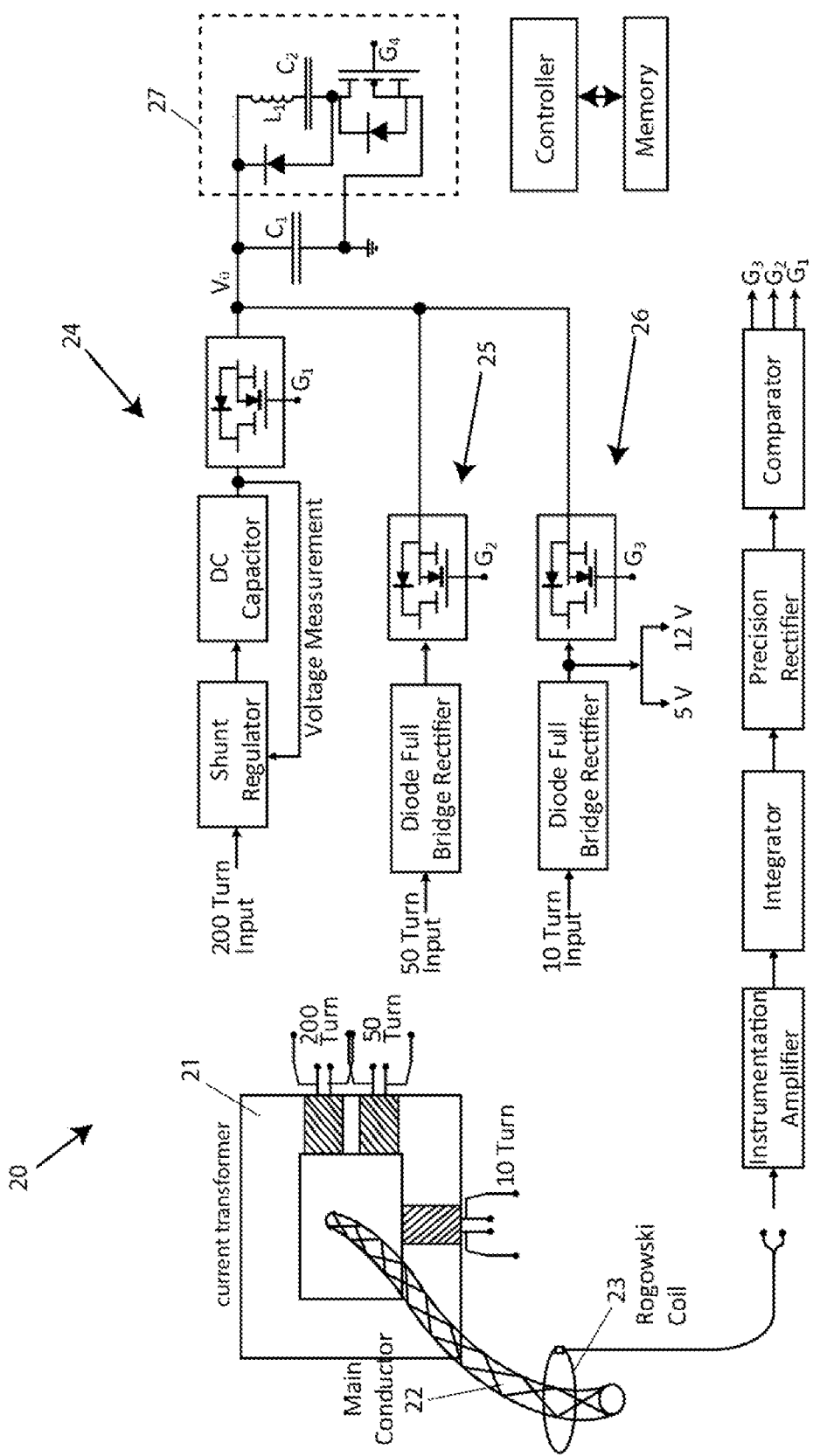
FIG. 2 illustrates a conventional power supply operable to support impedance injection at high and low line currents, having three secondary windings of a current transformer and three circuit branches corresponding to different levels of line current.

FIG. 2 illustrates a conventional DC power supply module 20 similar in function to DC power supply module 12. DC power supply module 20 employs a current transformer 21 with a single turn primary and three secondary windings (e.g., 200 turn, 50 turn, 10 turn) as shown. A Rogowski coil 23 is coupled to the primary winding as shown, for example with the Rogowski coil 23 surrounding the main conductor 22 (e.g., a power transmission line), and the current transformer 21 arranged to have the main conductor 22 along a path through the toroidal opening of the current transformer 21. Current transformer 21 may be a split core current transformer designed to be installed around a primary current carrying conductor without disconnecting wires or breaking the monitoring circuit. A circuit having three branches 24, 25, and 26 is used to charge an output capacitor C1. Each circuit branch is configured to handle a different range of line current. An energy storage circuit 27 is also shown. DC power supply module 20 will be shown to be more complex and potentially less reliable than DC power supply module 12 of the present disclosure.

Figure 3:
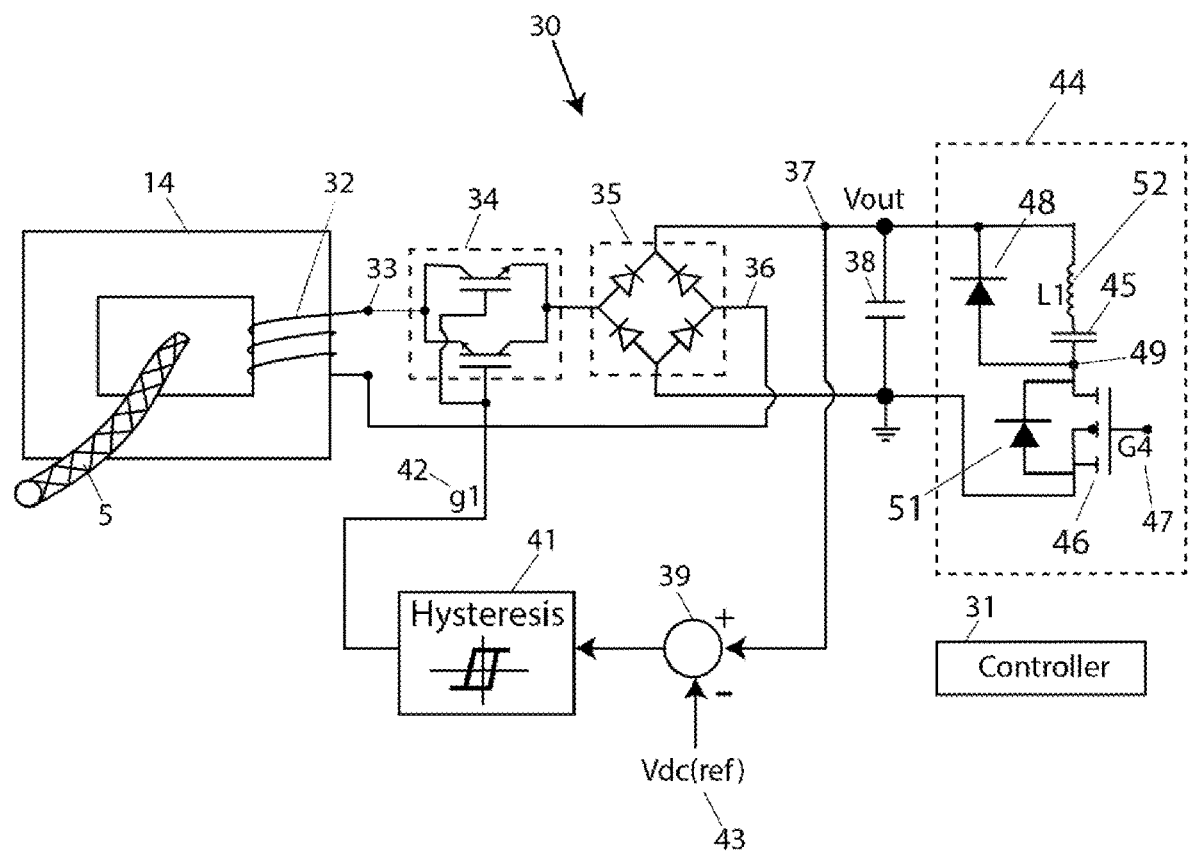
FIG. 3 illustrates a power supply module suitable and operable to support impedance injection at high and low line currents, having a single secondary winding of a current transformer and an energy storage circuit, according to an embodiment.

FIG. 3 illustrates a power supply module 30 according to an embodiment. In FIG. 3, power supply module 30 may be an embodiment of power supply module 12 of FIG. 1 (e.g., a DC power supply module). With continued reference to FIG. 3, current transformer 14 is coupled to power transmission line 5 (as shown in FIG. 1). Current transformer 14 may include a single turn primary winding as shown and a single secondary winding 32. Via a connection 33, an output of secondary winding 32 may connect with a dynamic switching device 34 whose output is coupled to a full-bridge rectifier 35. In some embodiments, dynamic switching device 34 may be implemented using a pair of IGBTs as shown or using a single MOSFET device. A first terminal 36 of rectifier 35 connects back to the secondary winding 32. In FIG. 3, second terminal 37 of rectifier 35 is labeled as Vout, which is an output voltage at an output node of power supply module 12, and appears across a DC power supply capacitor 38. A feedback loop is shown wherein Vout, from the second terminal 37, i.e., the output node of the power supply module 12, is coupled through a comparator 39 (e.g., implemented by a comparator circuit that has Vout and a voltage reference as inputs) and through a hysteresis function 41 to a control input g1 42 of dynamic switching device 34. Hysteresis function 41 may be used to stabilize the operation of power supply module 30 by eliminating excessive switching of current through secondary winding 32: it. It may be provided by any electronic circuit having a hysteretic characteristic, including, for example, a Schmitt Trigger or an amplifier circuit having hysteresis. Output Vout, from the output node of the power supply module 12, i.e., second terminal 37 of rectifier 35, is compared in comparator 39 against a Vdc(ref) 43 which is predetermined and may have a value in the range of 20-30V, for example.

In an embodiment, power flow control system 10 may enter injection mode when the line current is in a particular range, for example as low as 10-50 A, due to current transformer 14 operating in the responsive linear region 55, and to the construction of the charging circuits 34 and 35 controlled by the feedback loop from Vout to control signal g1, said items described in reference to power supply module 30. Accordingly, when entering the injection mode, power supply module 30 may enable an impedance injection unit of power flow control system 10 (e.g., impedance injection unit 7 of FIG. 1) to inject impedance into power transmission line 5 when the line current is in a certain range (e.g., as low as 10-50 A).

An energy storage circuit 44 is shown coupled to Vout. Energy storage circuit 44 may be used to provide a minimum power level of around 30 W for a minimum duration of around 50 milliseconds to support communications with controller 11 of power switching assembly 9 and controller 16 of bypass unit 8, for the purpose of safely shutting down power flow control system 10 in the event of a low line current or if a fault or a grid anomaly occurs and the current in transmission line 5 approaches zero. Energy storage circuit 44 includes a large storage capacitor 45 that stores a desired shut-down energy: it may have a value of 100 µF-10 mF, for example. In series with storage capacitor 45 is a pass switch 46 gated by a control signal G4 47. Control signal G4 47 is varied using controller 31 to maintain output voltage Vout within an acceptable range of 1 to 2V, for example, around the desired DC value. That is, in one embodiment control signal G4 47 is operated by the controller 31 so that storage capacitor 45 is charged when the desired DC voltage drops below a first threshold and is discharged if the desired DC voltage rises above a second threshold. Storage capacitor 45 is discharged when it provides power to the associated power flow control unit through diode 48. Diode 48 provides tracking between node 49 and output node Vout. Diode 51 is included in pass switch 46. Inductor 52 is provided in series with storage capacitor 45 to limit surge currents into or out of storage capacitor 45. In an embodiment, energy storage circuit 44 may support output voltage Vout during and immediately after a transient line current event, sufficient to power controller 11 via power supply module 12.

Figure 4:
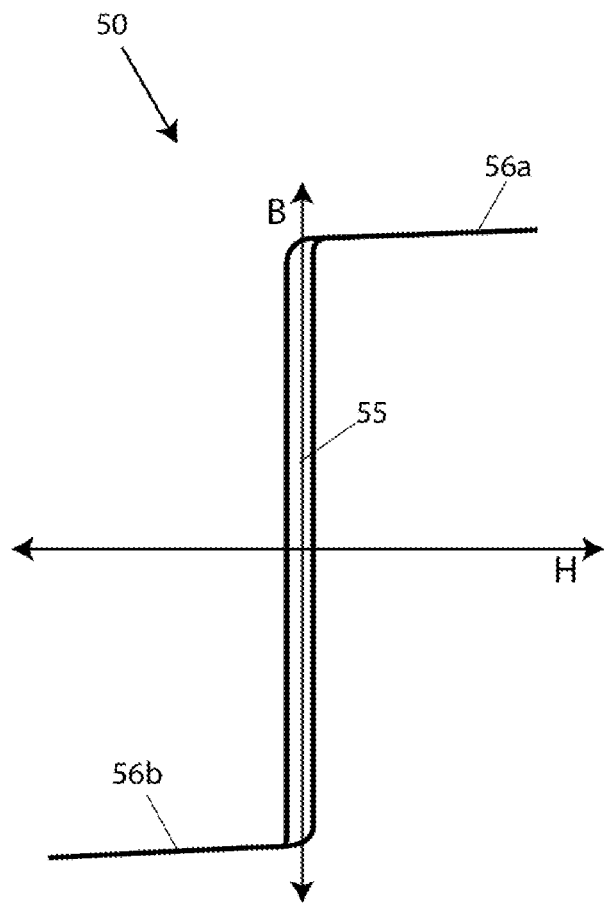
FIG. 4 illustrates a hysteresis characteristic for a high permeability core material according to an embodiment.

FIG. 4 illustrates a B/H hysteresis curve 50, showing magnetic flux density B field versus varying applied H field, for a magnetic material that can be used as a core of a current transformer, such as current transformer 14 of FIG. 1. The magnetic material may be an iron-based amorphous alloy 2605CO produced by METGLAS, INC. A linear region 55 is shown and saturation regions 56a and 56b. Faraday's law has Vind=−NΔϕ/Δt where:

Vind equals an induced voltage, N equals a number of loops, Δϕ equals a change in magnetic flux, and Δt equals a change in time. Accordingly, when dynamic switching device 34 (or switch) of FIG. 3 opens, H approaches zero and the magnetic material is in the linear region 55, used for normal operations. When a current spike occurs in the line current flowing in the primary winding, the magnetic material enters saturation such as region 56a or region 56b, corresponding to a large value in variable H. This limits the current in the secondary winding 32 and prevents damage to DC power supply module 12. This behavior of the high permeability magnetic material enables a relatively simple circuit such as circuit configuration of power supply module 30 of FIG. 3 for implementing DC power supply module 12 of FIG. 1, and this simplicity translates into low cost and high reliability. Direction of change in H and transition from region 56a to linear region 55 and transition from linear region 55 to region 56b, and vice versa, introduces hysteresis in the B/H curve, as generally known in the art.

FIG. 5 is a flow diagram of a method for harvesting power from a variable line current of a power transformer line according to an embodiment. Referring to FIG. 5, at block 61, method 60 may include coupling to the power transmission line a primary winding of a current transformer having a single turn primary winding and a single secondary winding. At block 62, method 60 may include configuring the current transformer to operate in a linear state for line currents in a range corresponding to normal operations, and to operate in a saturated state for line currents exceeding the range corresponding to normal operations. At block 63, method 60 may include providing a regulated DC power supply for powering controllers, and if the line current goes to zero, enabling the safe shutdown of the controllers.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different structural construct, names, and divisions. Accordingly, the disclosure of the invention is intended to be illustrative, but not limiting, of the scope of the invention.

While the invention has been described in terms of several embodiments, those of ordinary skill in the art will recognize that the invention is not limited to the embodiments described herein but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention has been described in relation to particular examples, which are intended in all respects to be illustrative rather than restrictive. Those skilled in the art will appreciate that many different combinations will be suitable for practicing the present invention. Other embodiments of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A power flow control system, comprising:
   an impedance injection module having a first controller, a direct current (DC) link capacitor, and switches configured to charge and discharge the DC link capacitor according to the first controller;
   a bypass module having a second controller and circuitry configured to bypass fault currents around the impedance injection module; and
   a power supply module operable to harvest power from line current in a power transmission line, using a current transformer, to power at least one of the first controller or the second controller;
   wherein the current transformer has a single turn primary winding, coupleable to the power transmission line, and a single secondary winding, on a core material having high permeability, and wherein the power supply module is to harvest the power through the single secondary winding and is operable to withstand a peak fault current up to 180 kiloamperes (kA) and a root mean square (RMS) current up to 63 kA having a duration of one second.

2. The power flow control system of claim 1, wherein the power flow control system maintains a predetermined voltage at a power supply capacitor in an event of a nonlinear transient in the line current.

3. The power flow control system of claim 1 wherein the impedance injection module is operable to inject impedance into the power transmission line when the line current is in a range of 10-50 A.

4. The power flow control system of claim 1 wherein the power flow control system is operable to communicate commencement of a shutdown procedure to an external support system in an event of a power failure.

* * * * *